US006185263B1

(12) United States Patent
Chan

(10) Patent No.: US 6,185,263 B1
(45) Date of Patent: *Feb. 6, 2001

(54) ADAPTIVELY CONFIGURABLE CLASS-A/CLASS-B TRANSMIT DAC FOR TRANSCEIVER EMISSION AND POWER CONSUMPTION CONTROL

(75) Inventor: Kevin T. Chan, Pasadena, CA (US)

(73) Assignee: Broadcom Corporation, Irvine, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/399,202

(22) Filed: Sep. 17, 1999

Related U.S. Application Data
(60) Provisional application No. 60/107,702, filed on Nov. 9, 1998.

(51) Int. Cl.[7] ............................................. H04L 27/04
(52) U.S. Cl. ................................. 375/295; 375/257
(58) Field of Search .................................. 375/216, 238, 375/295, 377; 341/118, 130, 141, 144, 135; 327/108, 82, 99; 326/82

(56) References Cited

U.S. PATENT DOCUMENTS

| | | | |
|---|---|---|---|
| 5,204,880 | 4/1993 | Wurster et al. | 375/36 |
| 5,267,269 | * 11/1993 | Shih et al. | 375/296 |
| 5,325,400 | 6/1994 | Co et al. | 375/60 |
| 5,399,996 | 3/1995 | Yates et al. | 331/74 |
| 5,600,321 | * 2/1997 | Wincn | 341/144 |
| 5,651,029 | 7/1997 | Yang et al. | 375/296 |
| 5,745,564 | 4/1998 | Meek | 379/410 |
| 5,757,298 | * 5/1998 | Manley et al. | 341/138 |
| 5,798,661 | 8/1998 | Runaldue et al. | 327/106 |
| 5,999,044 | * 12/1999 | Wohlfarth et al. | 327/563 |
| 6,052,076 | * 4/2000 | Patton, III et al. | 341/144 |
| 6,057,716 | * 5/2000 | Dinteman et al. | 327/108 |

* cited by examiner

Primary Examiner—Chi H. Pham
Assistant Examiner—Emmanuel Bayard
(74) Attorney, Agent, or Firm—Christie, Parker & Hale, LLP

(57) ABSTRACT

A power efficient and reduced electromagentic interference (EMI) emissions transmitter for unshielded twisted pair (UTP) data communication applications. Digital transmit data is converted to a current-mode differential signal analog waveform by a digital-to-analog converter (DAC). DAC line driver cells are adaptively configurable to operate in either a class-A or a class-B mode depending on the desired operational modality. Selection logic circuitry asserts command signals to individual line driver cells which operate the cells in either class-A or class-B, in operative response to a DAC control word. The same DAC control word adaptively configures the line driver cells to operate in accordance with at least two ethernet-type transmission standards. Numbers of line driver cells are adaptively disabled in operative response to a DAC control word, to conform the transmitter to differing transmission standards with differing voltage swing requirements.

13 Claims, 5 Drawing Sheets

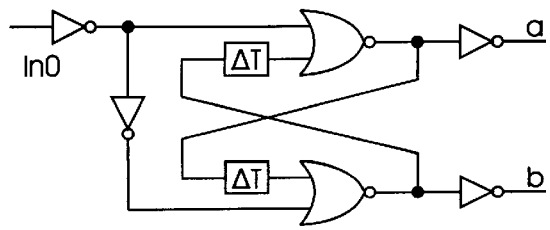
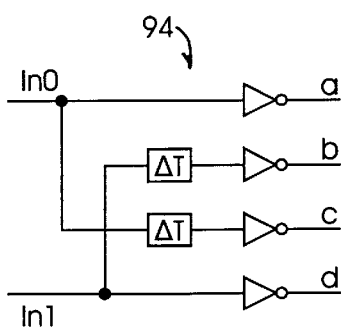
| Class-A | | | | | | | | |
|---|---|---|---|---|---|---|---|---|
| In0 | In1 | a | b | c | d | Ip | In | Diff. Mode | Com. Mode |
| 1 | 1 | 0 | 1 | 1 | 0 | I | I | 0 | 2I |
| 0 | 1 | 1 | 0 | 1 | 0 | 2I | 0 | 2I | 2I |
| 1 | 0 | 0 | 1 | 0 | 1 | 0 | 2I | -2I | 2I |
*FIG. 7A*  *FIG. 7B*
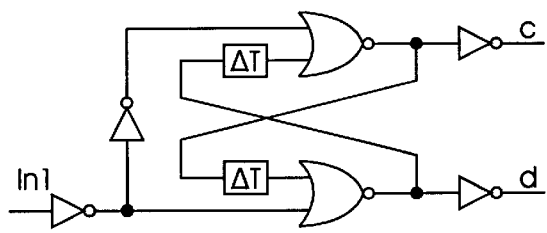
| Class-B | | | | | | | | |
|---|---|---|---|---|---|---|---|---|
| In0 | In1 | a | b | c | d | Ip | In | Diff. Mode | Com. Mode |
| 1 | 1 | 0 | 0 | 0 | 0 | 0 | 0 | 0 | 0 |
| 0 | 1 | 1 | 0 | 1 | 0 | 2I | 0 | 2I | 2I |
| 1 | 0 | 0 | 1 | 0 | 1 | 0 | 2I | -2I | 2I |
*FIG. 8A*  *FIG. 8B*

ADAPTIVELY CONFIGURABLE CLASS-A/CLASS-B TRANSMIT DAC FOR TRANSCEIVER EMISSION AND POWER CONSUMPTION CONTROL

CROSS-REFERENCE TO RELATED APPLICATION

This patent application claims the benefit of the filing date of United States Provisional Patent Application Ser. No. 60/107,702, filed Nov. 9, 1998 and entitled ETHERNET GIGABIT ANALOG SYSTEM, the entire contents of which are expressly incorporated herein by reference.

FIELD OF THE INVENTION

The present invention is directed to differential signal mode communication systems and, more particularly, to an integrated circuit transceiver that is adaptively configurable between Class-A and Class-B operation for optimized EMI emission characteristics and power consumption.

BACKGROUND OF THE INVENTION

The past few years has witnessed an almost exponential growth in the extent of high-speed data networks, and the data transmission speeds contemplated over such networks. In particular, bidirectional data transmission in accordance with the various Ethernet network protocols, over unshielded twisted pair (UTP) wiring, has emerged as a network implementation of choice for general commercial LAN installations as well as for some of the more prosaic residential and academic applications.

Local Area Networks (LAN) provide network connectivity for personal computers, work stations and servers. Ethernet in its original 10BASE-T form, remains the dominant network technology for LANs. However, among the high-speed LAN technologies available today, fast Ethernet, or 100BASE-T, has become the leading choice. Fast Ethernet technology provides a smooth, non-disruptive evolution from the 10 megabits per second (Mbps) performance of 10BASE-T to the 100 Mbps performance of 100BASE-T. The growing use of 100BASE-T connections to server and desktops is creating a definite need for even higher speed network technology at the backbone and server level.

The most appropriate solution to this need, now in development, is Gigabit Ethernet. Gigabit Ethernet will provide 1 gigabit per second (Gbps) bandwidth with the simplicity of Ethernet at lower cost than other technologies of comparable speed, and will offer a smooth upgrade path for current Ethernet installations.

No matter how implemented, Ethernet transceivers are found in a very wide range of application installations, from individual notebook or laptop computers to enterprise-wide wiring closets. Because of the range of installation types, Ethernet circuits often face certain conflicting constraints on their I/O modalities. For example, in enterprise-wide wiring closets, where transceiver density is high, radiative emissions (EMI) from constituent transceivers is a major source of concern in the struggle to maintain bandwidth and signal quality by minimizing cross-talk and other extraneous noise sources.

Conversely, in low density installations such as laptop or notebook computers, radiative emissions are of a substantially lower concern while the power consumption of an Ethernet transceiver becomes paramount. Given the relatively limited battery life of a laptop or notebook computer, it will be evident that the constituent electronic components of such a computer must operate at the lowest possible power consumption consistent with proper performance.

A conflict arises when it is recognized that radiative emissions are reduced when a differential signal transmitter, such as an Ethernet transmitter, is transmitting a differential signal in what is termed Class-A mode, i.e., the differential mode current varies in order to define the signal, while the common-mode current component is kept constant. However, constant common-mode current compels such circuitry to conduct a constant quanta of current at all times, even when the differential mode signal defines a zero value. It is well understood that current mode transmitters, outputting a constant common-mode current, necessarily consume relatively large amounts of power, caused by constant conduction of the output section. It is further understood that in order to minimize constant current conduction and thus power consumption, a differential signal system could be operated in what is termed a Class-B mode, i.e., one in which the common-mode current is allowed to vary between some maximum value and zero. However, when operating in Class-B mode, the variable common-mode current causes the very radiative emissions that one would seek to avoid in a high density installation.

Notwithstanding the foregoing, any modern nexus Ethernet communication system should also be able to communicate with other systems across all of the Ethernet communication standards prevalent in today's network environments. The difficulty here is that the different Ethernet standards often have differing differential voltage swing requirements, making the implementation of a cross-standard transmitter platform very difficult. The most common prior art solution to this difficulty is to implement an Ethernet transceiver with multiple transmitter sections, with each transmitter section optimized for performance under a particular standard, i.e., 10BASE-T, 100BASE-T, and the like. While effective in some degree, this particular approach compels a high degree of complexity and duplication in a given transceiver system, as well as requiring a great deal of silicon chip real estate when a cross-standard transceiver is implemented as an integrated circuit. Such solutions are expensive, unstable and, because the large amounts of duplicative circuitry must remain powered-up in order to be available at need, they consume prohibitive amounts of power even when major portions of the circuitry are quiescent.

It would be beneficial, therefore, both to circuit performance and to manufacturing economies, if an Ethernet-capable transceiver were to include a transmitter or transmit DAC that was adaptively configurable to operate as a cross-standard transmitter platform, as well as being adaptively configurable between Class-A and Class-B operational modes, depending on the intended installation. Such a circuit would provide the industry with a single-chip solution having such flexibility that it is able to be incorporated into high density systems where emissions are a problem, as well as low density systems where power consumption is the greatest concern. Such a single-chip solution would be able to communicate with other Ethernet installations regardless of the communication standard chosen.

SUMMARY OF THE INVENTION

In one aspect, the invention is suitable for implementation as a communication system including a differential signal transmitter. The transmitter includes a multiplicity of signal component output circuits, such as line driver cells, with each signal component output circuit being operable in a first mode sensitive to a first metric and a second mode sensitive to a second metric. A selection circuit asserts control signals which adaptively configure each signal component output circuit to operate in either the first mode or the second mode.

In another aspect of the invention, a differential signal transmitter which is implemented in a communication system includes a multiplicity of signal component output circuits, such as line driver cells, with each signal component output circuit contributing a particular signal quantum to a differential output signal. A maximal value of the sum of said quanta being determined by a particular transmission standard. The maximal value is defined by a corresponding number of signal component output circuits. A selection circuit asserts control signals to each of the signal component output circuits so as to adaptively disable a set of signal component output circuits, thereby limiting the maximal value of the sum of the signal quanta contributed by the remaining signal component output circuits to a value determined by a second transmission standard.

In particular, the transmitter might include an output DAC which, in turn, might further include a DAC decoder circuit which receives input digital signals and outputs a control word to the signal component output circuits.

The selection circuit further includes first and second logic circuits, each connected to receive the control word, the first logic circuit asserting control signals which operate a corresponding signal component output circuit in the first mode, the second logic circuit asserting control signals which operate a corresponding signal component output circuit in the second mode. In a further aspect of the invention, each signal component output circuit is constructed as a differential current mode driver cell, the first mode being a class-A constant common-mode current, the second mode being a class-B variable common-mode current. Advantageously, the DAC control word is the same for a particular signal quantum for both the first and second modes.

In a further aspect, a communication system according to the invention includes a differential signal transmitter which is constructed of a multiplicity of signal component output circuits, such as line driver cells. The differential signal transmitter includes first means for adaptively configuring the signal component output circuits to operate in either a first, emissions sensitive, mode or a second, power sensitive, mode. The differential signal transmitter further includes second means for adaptively configuring the signal component output circuits to operate in accordance with at least two transmission standards. Advantageously, the first and second means are implemented in a single integrated circuit.

BRIEF DESCRIPTION OF THE DRAWINGS

These and other features, aspects and advantages of the present invention will be more fully understood when considered with respect to the following detailed description, appended claims and accompanying drawings wherein:

FIG. 7A is a simplified schematic representation of Class-A switch logic circuitry;

FIG. 7B is an exemplary truth table illustrating the operation of the Class-A switch logic circuitry of FIG. 7A;

FIG. 8A is a simplified schematic representation of Class-switch logic circuitry; and FIG. 8B is an exemplary truth table illustrating the operation of the Class-B switch logic circuitry of FIG. 8A.

DETAILED DESCRIPTION OF THE INVENTION

The present invention might be aptly described as a system and method for adaptively configuring the operation of a multiplicity of differential signal I/O circuits such that they are able to operate in conformance with a variety of transmission standards, as well as be programmably configurable for the most efficient operation between the conflicting requirements of low power consumption and low radiated emissions. The invention contemplates an intelligent selection circuit which is able to selectively configure an I/O circuit, such as a driver cell array of a current-mode DAC, in several operational modes; enable a driver cell to operate in a first current mode, enable a driver cell to operate in a second current mode, or disable the driver cell altogether. This degree of operational flexibility allows a transmitter, constructed according to the invention, to be adaptively configurable to operate most efficiently in a reduced EMI emissions environment, a reduced power consumption environment and to operate in accordance with several different Ethernet-type communication standards.

Figure 1:
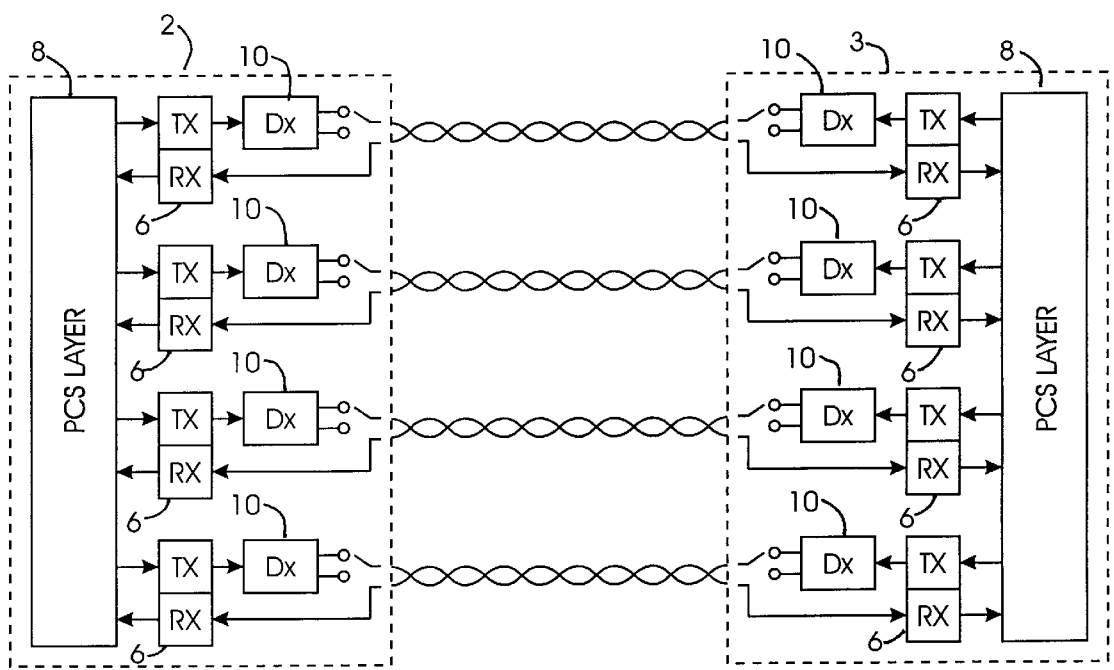
FIG. 1 is a semi-schematic simplified block diagram representation of a local and remote transceiver pair communicating over a bi-directional transmission channel including a configurable Class-A/Class-B transmit DAC in accordance with the present.

FIG. 1 is a simplified block diagram of a multi-pair communication system that might include the intelligent selection circuit according to the invention. The communication system illustrated in FIG. 1 is represented as a point-to-point system, in order to simplify the explanation, and includes two main transceiver blocks 2 and 3, coupled together with four twisted-pair cables. Each of the wire pairs is coupled between respective transceiver blocks and each communicates information developed by respective ones of four transmitter/receiver circuits (constituent transceivers) 6 communicating with a Physical Coding Sublayer (PCS) block 8.

Each transmitter circuit is coupled to a respective wire pair through a driver circuit Dx 10 which includes intelligent mode selection circuitry in accordance with the present invention. Each driver circuit 10 is depicted as defining two outputs selectable through a switch, in turn coupled to a respective wire pair transmission media. Although represented as such for ease of understanding, the two outputs of each driver circuit 10 are not intended to be physical outputs, but rather are intended to represent two operational output modes, Class-A and Class-B. Each driver circuit 10, suitably include intelligent selection circuitry, in accordance with the invention, which is able to select which of the two operational modes is most appropriate for the environment which hosts any one particular transceiver.

Although FIG. 1 illustrates a single driver circuit corresponding to a respective twisted wire pair, the illustration is simplified for ease of explanation of the principles of the invention. It should be understood that each driver circuit 10 represents a multiplicity of differential output cells, the sum of which defines the physical signals directed to the transmission medium.

Figure 2:
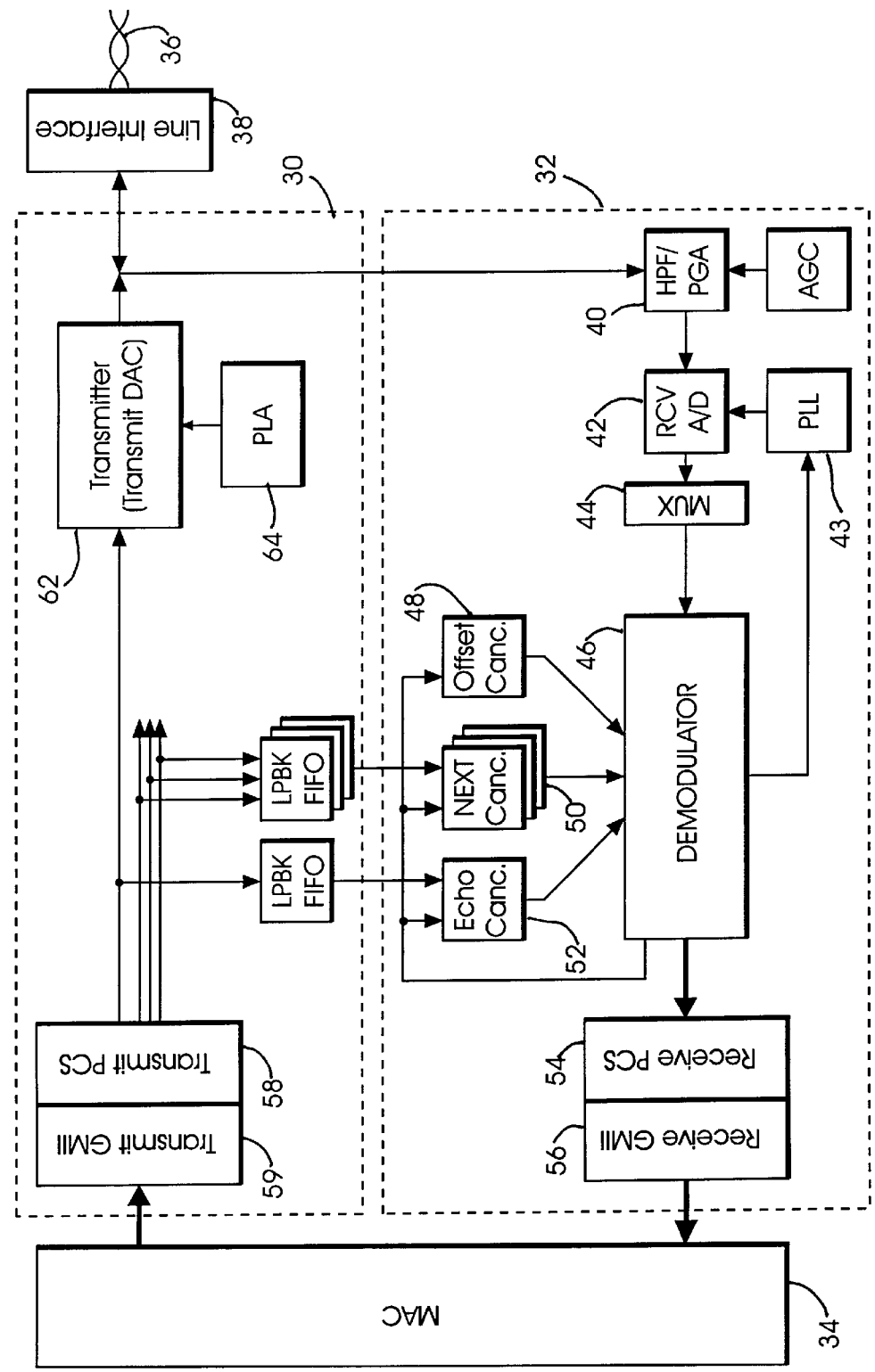
FIG. 2 is a semi-schematic, simplified block diagram of a transceiver, adapted for bidirectional communication, including a transmit DAC configurable between reduced EMI emission and reduced power consumption modes, in accordance with the present invention.

FIG. 2 is a simplified block diagram of one implementation of a transceiver system, adapted for full-duplex communication, the arrangement of which might be pertinent to an understanding of the principles of operation of the present invention. The exemplary transceiver of FIG. 2 encompasses the physical layer (PHY) portion of a transceiver and is illustrated as including a transmitter section 30 and a receiver section 32, coupled between a media access layer (MAC) 34 and a communication channel; in this case, represented by twisted pair wiring, also termed unshielded twisted pair (or UTP) wiring.

The transceiver of the illustrated embodiment operates in accordance with a transmission scheme which conforms to the 1000BASE-T standard for 1 gigabit per second (Gb/s) Ethernet full-duplex communication over four twisted pairs of Category-5 copper cables. For ease of illustration and description, the embodiment of FIG. 2 depicts only one of the four 250 Mb/s constituent transceivers which are configured in parallel fashion and which operate simultaneously to effect 1 Gb/s in order to effect 1 Gb/s communication. Where signal lines are common to all four of the constituent transceivers, they are rendered in a bold line style. Where signal lines were laid to a single transceiver, they are rendered in a thinner line style.

In operation, the receive path of the exemplary transceiver circuit of FIG. 2 receives an analog signal from the twisted pair cable 36 through a simplified line interface circuit 38. Calling the line interface circuit simplified refers to the fact that it is constructed with a significantly lower complexity than conventional hybrid circuits, and might be a simplified line interface circuit such as described in co-pending application entitled "Adaptive Electronic Transmission Signal Cancellation Apparatus for Full-Duplex Communication" commonly owned by the assignee of the present invention, the entire contents of which are expressly incorporated herein by reference.

Received analog signals are provided to the receiver section 32 where they may be pre-conditioned by filter/amplification circuitry 40, such as a high-pass filter (HPF) and programmable gain amplifier (PGA), before being converted to digital signals by a receive analog-to-digital converter (ADC) 42 operating at a sampling rate of about 125 MHz. ADC timing is controlled by the output of a timing recovery circuit 43 which might be configured as a phase-lock-loop (PLL) or some other feed-back controlled circuitry configured for determinable periodic operation.

Digital signals, output by the receive ADC 42, along with the outputs from the receive ADCs (not shown) of the other three constituent transceivers, are input to a pair-swap multiplexer circuit (MUX) 44 which functions to sort out the four input signals from the four ADCs and direct each signal to its respective appropriate demodulator circuit for demodulation and equalization. Since the coding scheme for gigabit communication is based on the premise that signals carried by each twisted pair of wire correspond to a 1-dimensional (ID) constellation and that the four twisted wire pairs collectively form a 4-dimensional (4D) constellation, each of the four twisted wire pairs must be uniquely identified to a particular one of the four dimensions in order that decoding proceed accurately. Any undetected and uncompensated swapping of wire pairs would result in erroneous decoding. The pair swap MUX 44 maps the correct input signal to the demodulation circuit 46.

Demodulator 46 functions to demodulate the receive digital signal and might also provide for channel equalization. Channel equalization might suitably include circuitry for compensating the inter-symbol-interference (ISI) induced by partial response pulse shaping circuitry in the transmitter section of a remote gigabit capable transceiver, which transmitted the analog equivalent of the digital receive signal. In addition to ISI compensation, the demodulation also compensates for other forms of interference components such as echo, offset and near end cross-talk (NEXT) by subtracting corresponding cancellation vectors from the digital receive signal. In particular, an offset cancellation circuit 48 generates an estimate of the offset introduced at the transceiver's analog front end (including the PGA and ADC). Three NEXT cancellation circuits, collectively identified as 50, model the near end cross-talk impairments in the receive signal caused by interference between the receive signal and the symbols (signals) sent by the transmitter sections of the other three local constituent transceivers. Since the NEXT cancellation circuits 50 are coupled to the transmit signal path, each receiver has access to the data transmitted by the other three local transmitters. Thus, NEXT impairments may be replicated by suitable filtering. By subtracting the output of the NEXT cancellation circuits 50 from the receive signal, NEXT impairments may be approximately canceled.

Following echo, NEXT and offset cancellation, receive signals are decoded (by a trellis decoder, for example) and provided to a receive Physical Coding Sublayer (PCS) lock 54 and thence to the media access layer (MAC) 34 through a media independent interface circuit (GMII) 56.

In transmit operations, transmit signals are provided by the MAC 34 to a transmit PCS block 58 through a transmit GMII circuit 59. In the case of gigabit Ethernet transmissions, coded signals might be processed by a partial response pulse shaping circuit 60 before being directed to a transmit digital-to-analog converter (TXDAC) 62 for conversion into analog signals suitable for transmission over twisted pair wiring 36 to a remote receiving device through line interface circuitry 38.

The exemplary transceiver system of FIG. 2 has been described in the context of a multi-pair communication system operating in conformance with the IEEE 802.3 standard (also termed 1000BASE-T) for 1 gigabit Ethernet full-duplex communication over Category-5 twisted pair wiring. However, and in accordance with the present invention, the exemplary transceiver is further configurable for operation in conjunction with 10BASE-T, 100BASE-T and 100BASE-Tx performance standards. In particular, the transmitter 62 is configurable to accommodate both 1.0 volt output swings characteristic of Tx and the 2.5 volt output swings characteristic of 10BASE-T operation. In a manner to described in greater detail below, the transmitter 62 is constructed to include an array of output driver cells, with individual cells making up the array able to be adaptively included or excluded from operation in order to define a variety of characteristic output voltage swings. A programmable logic array (PLA) 64 hosts the operating logic which defines the selectivity of output current driver cells making up the transmitter's driver array. Selectivity is provided by "select" signals asserted by the PLA 64 in response to its programming, and are directed to the transmitter 62 where they function to identify which of the individual cells will be operational. In addition, "select" signals asserted by the PLA determine whether a selected output current driver cell will operate in a Class-A or Class-B mode.

Figure 3:
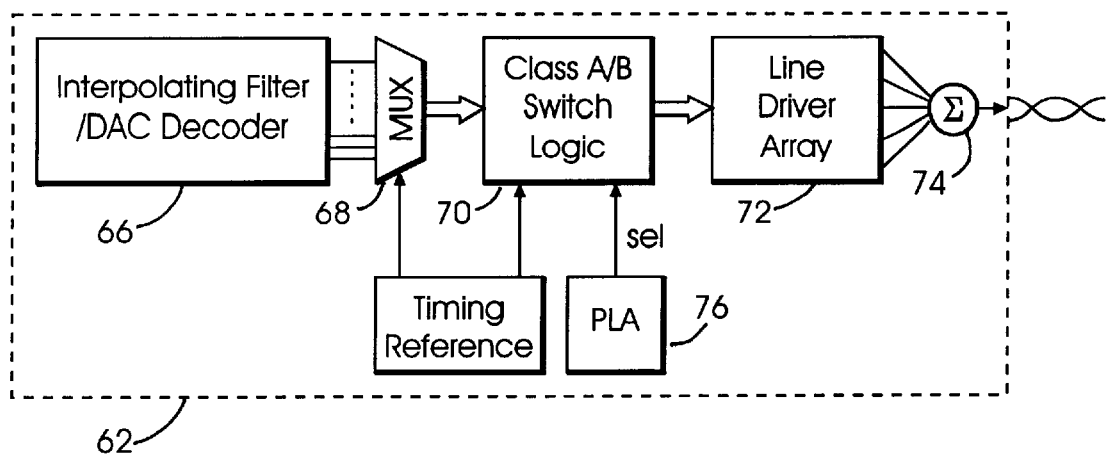
FIG. 3 is a semi-schematic, simplified block diagram of the configurable transmit DAC of FIG. 2, illustrated as driving a UTP transmission line.

FIG. 3 depicts a semi-schematic, simplified block diagram of one embodiment of a transmitter or transmit DAC 62, including Class-A/B switch logic and line driver circuitry in accordance with the present invention. The transmit DAC 62 might be viewed as functionally subdivided into a DAC portion, including an interpolating filter and DAC decoder 66 which together function to pulse shape the transmit signal in order to reduce EMI emission caused by the transmission line and convert the filter digital data to an analog current-mode output signal. An exemplary interpolating filter and DAC decoder circuit 66 might be implemented in a manner described in co-pending application entitled "Fully Integrated Ethernet Transceiver Architecture With Interpolating Filter", commonly owned by the assignee of the present invention, the entire contents of which are expressly incorporated herein by reference. Briefly, the functionality of an interpolating digital filter might be integrated with the binary decoding functionality of a DAC and might further be implemented logically in a memory device such as read-only memory (ROM), as part of the memory content. When implemented in such manner, the logical implementation and memory replaces digital filtering circuits, DAC decoding logic circuits and resynchronization logic circuits that are conventionally implemented in hardware. Thus, the hardware functionality of these circuits is rendered into algorithmic form and implemented in a programmable memory circuit.

DAC decoder output signals are directed to a synchronized multiplex (MUX) circuit 68. Selection and ordering of the DAC decoder output through the MUX follows a Gray-code selection criteria which prevents glitches in developed DAC control words because the selection criteria only allows transitions to proper decoder outputs.

DAC control words control operation of a Class-A/B switch logic circuit 70 which, in turn, provides activation signals to individual line driver cells making up a line driver array 72. Characteristically, the output current of a DAC is generated by an array of identical line driver cells which are turned-on or turned-off depending on the state of a particular DAC control word. For each input sample, output currents of all of the active line driver cells are added together at a summing junction 74 to produce an analog representation of the original digital input. Control of individual driver cells and their operational mode (Class-A/B) is determined by "select" signals provided to the Class-A/B switch logic circuit 70 by a PLA 76. Necessarily, the number of the individual line driver cells implemented and their characteristic operational mode is chosen in order to meet the resolution requirements of the DAC as defined by the transmission standard.

Figure 4:
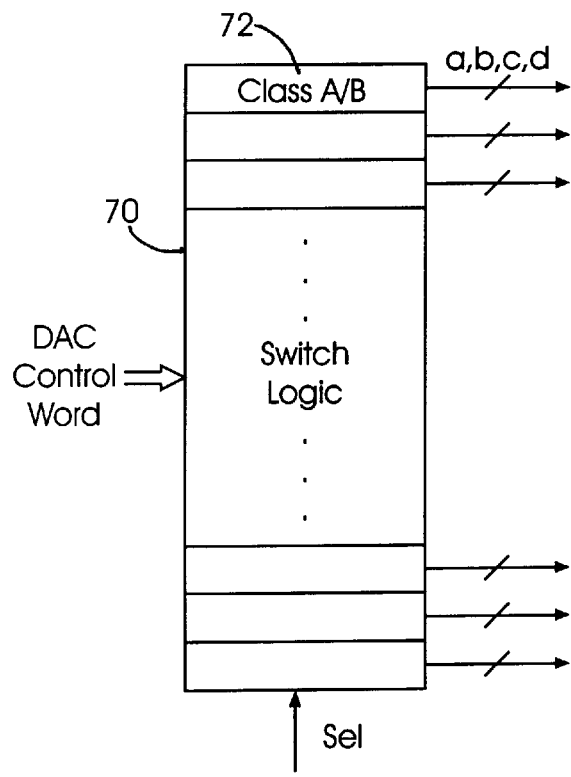
FIG. 4 is a semi-schematic block diagram of switch logic circuitry for controlling operation of a DAC line driver current cell array.

FIG. 4 is a semi-schematic block diagrammatic representation of Class-A/B switch logic circuitry 70, suitable for receiving a DAC control word and generating a plurality of line driver cell control signals, each set of control signals corresponding to a particular one of individual line driver cells making up a line driver array. For a transmitter that supports multiple communication standards such as 10BASE-T, 100BASE-T4/Tx/T2, 1000BASE-T, and the like, the number of individual driver cells making up the driver array will depend on the maximum, worst-case output voltage swing required by the transmission standards. In the exemplary embodiment, there are twenty-five individual current driver cells, each outputting a particular current quanta and for purposes of this specification, will be deemed normalized such that each of the twenty-five cells might be termed "full" cells. In addition, the line driver array 72 includes a "half" cell, so defined because the current quanta produced by that cell exhibits a value one-half the value of the current quanta output by the twenty-five "full" cells. Accordingly, depending upon the actual value of the current quanta and the load across which the output current is developed, full value output swings can be developed by the transmitter of the present invention in fifty equal-sized "half" steps by switching various combinations of "full" cells and the "half" cell into operation. For example, in normal 10BASE-T operation, the output voltage swing defined by the standard is 2.5 volts. In order to accommodate this output voltage swing, all twenty-five cells, plus the "half" cell are used to develop the output. It will be understood by those having skill in the art that each of the twenty-five "full" cells develops a current sufficient to develop 0.10 volts across a load, with the "half" cell providing an additional degree of granularity to the output. Conversely, in 100BASE-Tx mode, the standard defines a 1.0 volt output swing. With driver cells configured to each develop 0.10 volts across a load, only ten cells are required from the line driver array in order to accommodate this output swing.

In FIG. 4, the switch logic circuit 70 includes twenty-six Class-A/B control circuits 72 each of which defines whether their respective line driver cell is operable or non-operable and, if operable, whether each corresponding driver cell outputs a differential current in Class-A or Class-B mode. Each of the Class-A/B control circuits 72 defines four output signals a, b, c and d which, in a manner to be described further below, controls both operation and mode of each line driver cell. Control signals are asserted by each of the control circuits 72 in accordance with a select signal (SEL) asserted by the PLA (76 of FIG. 3).

Figure 6:
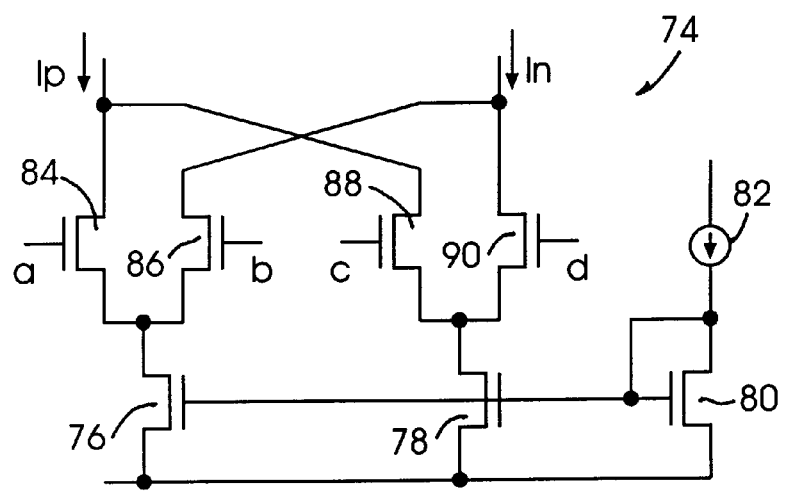
FIG. 6 is a simplified schematic diagram of a DAC line driver cell, configured to operate in both Class-A and Class-B modes.

Turning now to FIG. 6, an exemplary embodiment of an individual line driver cell is indicated generally at 74. In general terms, the line driver cell 74 might be aptly described as two differential pairs cross-coupled to define a differential output ($I_p I_n$). Current flowing through each of the differential pairs is defined by two n-channel current source transistors 76 and 78 each of which have their gate terminals coupled to a stable bias voltage developed by an n-channel transistor 80 configured as a voltage follower. The bias voltage generated by the MOSFET diode transistor 80 is determined by the characteristic value of a current source 82 which provides a stable current reference to the MOSFET diode transistor 80 such that a stable bias voltage is developed on its gate terminal.

As is well understood in the art, the current source transistors 76 and 78 conduct a characteristic current which is proportional to the current developed by the current source 82, with the proportionality constant being determined by the area ratios of the current source transistor with respect to the MOSFET diode transistor 80. As the term is used herein, "area ratio" refers to the well-known transistor width/length (W/L) ratio.

Operationally, differential output currents are developed by the differential pairs in response to control inputs a, b, c and d, each driving the gate terminal of a respective n-channel transistor 84, 86, 88 and 90 configured as switches. N-channel switch transistor control the output current operation of the driver cell and determine the quanta of current defining the differential outputs.

For example, for matched current sources 76 and 78, each conducting a characteristic current I, when control signals a and c are in a state so as to turn on corresponding switch transistors 84 and 88, while control signals b and d are in a state so as to maintain switch transistors 86 and 90 in an off condition, the $I_p$ output mode will define a current equal to 2×I, while $I_n$ is equal to 0. Other combinations will immediately suggest themselves to one having skill in the art and can be easily determinable by merely turning the various switch transistors on or off along a programmed sequence until all possible binary combinations of control signals states have been exhausted.

Figure 5:
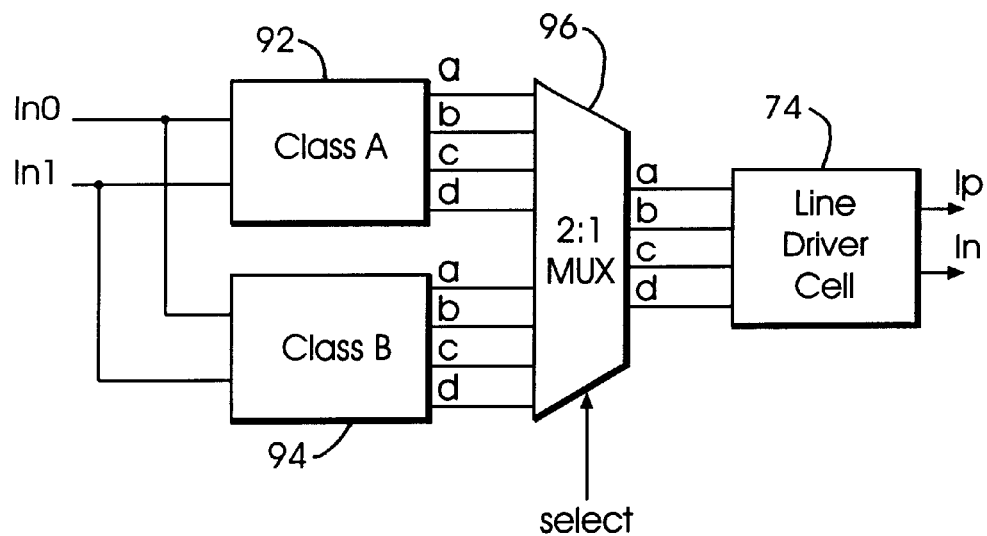
FIG. 5 is a semi-schematic simplified block diagram of illustrating details of switch logic circuitry and a line driver cell for a single current component.

Turning now to FIG. 5, each current drive cell 74 is able to be controlled for either Class-A, Class-B, or a combination of Class-A and Class-B operation by selecting control signals a, b, c and d from either a Class-A driver control logic circuit 92 or a Class-B driver control logic circuit 94 by a 2:1 MUX 96. Determination of whether the line driver cell will be driven in Class-A or Class-B mode is made by a select signal that determines which of the control signals (a, b, c and d) will be selected by the MUX 96. Further, determination of the binary state of the control signals (a, b, c and d) is made by two input signals In0 and In1 which make up that portion of the DAC control word directed to that particular corresponding Class-A/B switch logic section (72 of FIG. 4).

It should be noted here that the DAC decoder (66 of FIG. 3) will necessarily have as many outputs as there are individual line driver cells to be driven, i.e., the output of the DAC decoder is 26 wide in the exemplary embodiment. Thus, the DAC decoder is capable of providing twenty-six pairs of In0 and In1 control signals; one pair directed to each switch logic and line driver cell combination.

As noted above, each individual current driver cell can be controlled for either Class-A, Class-B or a combination of Class-A and Class-B operation by operation of the Class-A and Class-B driver control logic circuitry 92 and 94 of FIG. 5. With reference to the current driver cell 74 of FIG. 6, Class-A and Class-B operation of the driver cell will now be described in connection with the following Table 1 and Table 2.

In particular, Class-A operation of the line driver current cell is characterized by a constant common output current, without regard to the actual value of the differential output current of the cell.

TABLE 1

| INPUT SIGNALS | | | | OUTPUT SIGNALS | | | |
|---|---|---|---|---|---|---|---|
| a | b | c | d | Ip | In | Diff. Mode | Com. Mode |
| 1 | 0 | 0 | 1 | 1.0*I | 1.0*I | 0 | 2.0*I |
| 1 | 0 | 1 | 1 | 1.5*I | 0.5*I | 1.0*I | 2.0*I |
| 1 | 0 | 1 | 0 | 2.0*I | 0 | 2.0*I | 2.0*I |
| 1 | 1 | 0 | 1 | 0.5*I | 1.5*I | −1.0*I | 2.0*I |
| 0 | 1 | 0 | 1 | 0 | 2.0*I | 2.0*I | 2.0*I |

As illustrated in Table 1, given the particular binary states of the control signals a, b, c and d, the common output current is seen to have a constant value equal to 2.0*I. For example, when control signals a and d are high while control signals b and c are low, the corresponding switch transistors 84 and 90 are both in the on state, causing them each to conduct the full value I of the current generated by the respective current sources 76 and 78. Accordingly, the outputs Ip and In each take on a value of 1.0*I.

As illustrated in the second row of Table 1, when control signal c is taken high, thus turning on the second switch transistor 88 of the corresponding differential pair, each of the transistors of the pair conduct one-half of the current I defined by the respective current source transistor (in this case, transistor 78). Thus, $I_n$ exhibits a value of 0.5*I, while the additional 0.5*I conducted by its mate in the pair is a reflected in the value of $I_p$. Thus, $I_p$ exhibits a value of 1.5*I. The remaining combinations of binary states of the control signals a, b, c and d necessary to maintain a common output current value of 2.0*I will be evident to those having skill in the art upon examination of the remaining entries with Table 1. Since the output currents ($I_p$ and $I_n$) may take on only five values (0, 0.5*I, 1.0*I, 1.5*I and 2.0*I), all that remains is to ensure that the absolute value sum of the two currents is equal to, in this case, 2.0*I. As illustrated in Table 1, the algebraic sums of the currents define five particular values of differential output current, i.e., −2.0*I, 31 1.0*I, 0, 1.0*I and 2.0*I as is expected.

Accordingly, a Class-A operated driver cell will be expected to have low EMI emissions but consume a relatively higher amount of power due to the constant common mode output signal. In Class-B operation, however, the driver cell can be operated to produce the same degree of varying differential current output signals but with a varying common-mode current output. In Class-B operation, power consumption is significantly reduced at the expense of higher radiative emissions due to the varying common-mode output current as illustrated in the following Table 2.

TABLE 2

| INPUT SIGNALS | | | | OUTPUT SIGNALS | | | |
|---|---|---|---|---|---|---|---|
| a | b | c | d | Ip | In | Diff. Mode | Com. Mode |
| 0 | 0 | 0 | 0 | 0 | 0 | 0 | 0 |
| 1 | 0 | 0 | 0 | 1.0*I | 0 | 1.0*I | 1.0*I |
| 1 | 0 | 1 | 0 | 2.0*I | 0 | 2.0*I | 2.0*I |
| 0 | 0 | 0 | 1 | 0 | 1.0*I | −1.0*I | 1.0*I |
| 0 | 1 | 0 | 1 | 0 | 2.0*I | −2.0*I | 2.0*I |

In one particular embodiment, such as might be implemented in a transceiver as depicted in FIG. 2, Class-A and Class-B logic circuits (92 and 94 of FIG. 5) might be implemented to output control signals a, b, c and d which define a truncated set of the differential and common-mode output currents illustrated in Tables 1 and 2, above. As illustrated in FIG. 5, the DAC control word outputs a pair of control signals In0 and In1 for each logic circuit and line driver cell combination. Necessarily, each control pair of the DAC word is able to take on only four binary values (0:0, 0:1, 1:0 and 1:1). FIG. 7A is a simplified schematic diagram of one particular implementation of a Class-A logic circuit connected to receive an input control pair from the DAC word and generate the four driver control signals. FIG. 7B illustrates the corresponding logic table for deriving a, b, c and d control signals In0 and In1 in Class-A operation. The Class-A logic circuit, indicated generally at 92, is characterized by mirror image circuits, each including a cross-coupled pair of two-input NOR gates. The output of each NOR gate is buffered by an inverter circuit as are the DAC word control pair inputs. As illustrated in FIG. 7A, each of the two input NOR gates has its cross-coupled input connected through a delay element ΔT which functions to prevent the outputs of each mirror-image circuit from being at a logic low at the same time.

As illustrated in the logic table of FIG. 7B, the DAC control pair In0 and In1 takes on three binary values, i.e., 1:1, 0:1 and 1:0. For the first input value (1:1), only one switch transistor of each differential pair of the driver cell of FIG. 6 is in operation. Thus, both $I_p$ and $I_n$ are at a value of 1.0*I, the differential mode current is 0 and the common-mode current is 2.0*I. In the next input binary state, i.e., 0:1, a and c activate their respective switch transistors causing the $I_p$ output to equal 2.0*I. Since b and d are low, their respective switch transistors are off and $I_n$ conducts no current. Thus, the differential output current is 2.0*I and the common-mode output current is again 2.0*I. Conversely, when the binary value of the DAC control pair is flipped from the previous state, i.e., 1:0, it will be understood that b and d cause their respective switch transistors 86 and 90 to conduct while the previous conduction pair 84 and 88 are off. Thus, $I_n$ conducts 2.0*I while $I_p$ conducts 0 current. The differential current is thus −2.0*I while the common-mode current is again 2.0*I.

FIG. 8A is a simplified schematic diagram of a logic circuit adapted to take a DAC control word pair and develop the four control signals a, b, c and d in a manner suitable for operating the driver cell of FIG. 6 in Class-B mode. FIG. 8B is the corresponding logic table for deriving a, b, c and d control signals from In0 and In1 in a Class-B operational mode. As depicted in FIG. 8A, In0 and In1 are buffered through inverter circuits to generate a, c and b, d, respectively.

The corresponding Class-B logic table in FIG. 8B illustrates the logical states of the four driver control signals, the respective Ip and In output drive by the driver cell in response to the control signals, the differential output current and common-mode output current with respect to the same binary values of the DAC control pair (1:1, 0:1 and 1:0) as was the case with FIG. 7B above. From the three input conditions, it will be seen that only the first, i.e., 1:1, gives a different result from the Class-A case described above. The remaining two input conditions, i.e., 0:1 and 1:0, result in the same differential mode and common-mode output current. In the first case, however, all of the four driver cell control signals are 0, thereby defining a differential output current of 0 but with a corresponding common-mode current of 0 as well.

In accordance with the present invention, current driver cell control signals can be adaptively determined by Class-A and Class-B logic circuits in order to choose a driver cell's operational mode in order to meet conflicting requirements of power efficiency and reduced EMI emissions. In order to achieve the highest value of power efficiency, i.e., lowest power consumption, all of the current driver cells would be expected to be placed in Class-B operational mode. Conversely, for the lowest EMI emissions configuration, it would be expected that all of the current driver cells would be configured to operate in Class-A mode. In typical application conditions, a transceiver's transmit DAC would be expected to have its current driver cells operating in a mixed Class-A/B mode. For example, in nominal 10BASE-T operation, approximately 40 percent of the cells (ten cells) would be configured to operate in Class-B mode, while 60 percent of the cells (fifteen cells) would be configured to operate in Class-A mode. If the transceiver were anticipated to operate according to the Tx standard, i.e., 1.0 volt swings, ten of the cells would be typically configured to operate in Class-A mode while the remaining fifteen cells would be disabled.

Disabling a particular cell would only require that that cell be placed in Class-B operational mode and the DAC control word pair (In0 and In1) would be set at a binary value so as to put all of the driver cell control signals a, b, c and d in a low state. In the exemplary embodiment, In0 and In1 would be asserted as 1:1. Once all of the current cell control signals are in a low state, the corresponding current cell conducts no current, effectively disabling that cell.

It should be noted that the current driver cells are topologically identical, thus the same current cell is used whether the system is in Class-A or Class-B operational modes. There is therefore no incompatibility between Class-A and Class-B outputs. Further, it should be understood that any number of current driver cells can be configured to operate in Class-A or Class-B modes by merely programming a control PLA to issue the appropriate select signals to the transmitter. The driver cells are therefore fully adjustable and the mix of Class-A and Class-B modes will depend solely on the application desired for the transceiver. For example, notebook computer applications have a great deal of sensitivity toward power consumption while relegating EMI emissions to a secondary consideration. Since notebook computers are battery operated and have a limited power supply lifetime, a transceiver operating in such an environment would be configured to operate primarily in Class-B mode.

Conversely, in an enterprise application, such as a wiring closet, the transceiver would be configured to operate primarily in Class-A mode in order to reduce EMI emissions. Power consumption considerations are typically secondary in such applications.

A transmitter constructed according to the invention is further advantageous in that the same DAC control word (In0 and In1) is used to define the differential signal output in both the Class-A and the Class-B modes, as illustrated in FIGS. 7B and 8B. Since the same current cell is used in both cases, and since the DAC control word remains the same, the system is inherently seamless as a cross-mode platform. No complex decision logic, or multiple DAC decoder architectures are required.

Notwithstanding its ability to be adaptively configurable for Class-A and Class-B operation, the invention is additionally advantageous in that it can be configured to operate between and among various Ethernet transmission standards. In particular, by merely disabling or re-enabling groups of current driver cells, the transmitter according to the invention can operate under 10BASE-T, 100BASE-T, 100BASE-Tx and 1000BASE-T standards seamlessly. Thus, a single integrated circuit transceiver is able to perform a multiplicity of roles under a variety of conditions in a seamless and flexible manner.

Neither are the principles of the invention limited to the particular Ethernet standards discussed above. As standards evolve, differing output voltage swing requirements are easily accommodated by the present invention by changing the "width" of the DAC control word and the number of driver cells to capture the new requirements. Nor is the invention limited by the number of cells making up a voltage step. DAC resolution and accuracy can be further enhanced by defining "quarter" cells, and the like, and making appropriate changes to the decoder and switching logic sections.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A communication system including a differential signal transmitter, the transmitter comprising:

a multiplicity of signal component output circuits, each signal component output circuit operable in a first mode sensitive to a first metric and a second mode sensitive to a second metric, wherein, each signal component output circuit contributing a particular signal quantum to a differential output signal, a maximal value of the sum of said quanta determined by a particular transmission standard, the maximal value defined by a corresponding number of signal component output circuits, wherein a control word adaptively disables a set of signal component output circuits so as to limit the maximal value of the sum of the signal quanta contributed by the remaining signal component output circuits to a value determined by a second transmission standard; and a selection circuit, the selection circuit asserting control signals adaptively configuring each signal component output circuit to operate in either the first mode or the second mode wherein, the selection circuit includes a first logic circuit connected to receive the control word, the first logic circuit asserting control signals which operate a corresponding signal component output circuit in the first mode, and a second logic circuit connected to receive the control word, the second logic circuit asserting control signals which operate a corresponding signal component output circuit in the second mode and wherein the transmitter includes an output DAC, the output DAC further including a DAC decoder circuit, the decoder circuit receiving input digital signals and outputting a control word to the signal component output circuits, wherein the control word is the same for both the first and second modes.

2. The communication system according to claim 1, wherein the first metric corresponds to radiative emissions and wherein the second metric corresponds to power consumption.

3. The communication system according to claim 2, wherein each signal component output circuit comprises a differential current mode driver cell, the first mode comprising a Class-A constant common-mode current, the second mode comprising a Class-B variable common-mode current.

4. The communication system according to claim 3, wherein the control word takes on a same value to both adaptively disable a set of signal component output circuits and to control operation of the same set of signal component output circuits with respect to the first or second modes.

5. A communication system including a differential signal transmitter, the transmitter comprising:

a multiplicity of signal component output circuits, each signal component output circuit contributing a particular signal quantum to a differential output signal, a maximal value of the sum of said quanta determined by a particular transmission standard, the maximal value defined by a corresponding number of signal component output circuits; and a selection circuit, the selection circuit asserting control signals to each of said signal component output circuits, wherein the control signals adaptively disable a set of signal component output circuits so as to limit the maximal value of the sum of the signal quanta contributed by the remaining signal component output circuits to a value determined by a second transmission standard.

6. The communication system according to claim 5, wherein the multiplicity of signal component output circuits are operable in a first mode sensitive to a first metric and a second mode sensitive to a second metric, the transmitter further comprising a selection circuit, the selection circuit asserting control signals adaptively configuring each signal component output circuit to operate in either the first mode or the second mode.

7. The communication system according to claim 6, wherein the transmitter includes an output DAC, the output DAC further including a DAC decoder circuit, the decoder circuit receiving input digital signals and outputting a control word to the signal component output circuits, wherein the control word is the same for both the first and second modes.

8. The communication system according to claim 7, the selection circuit further comprising:

a first logic circuit connected to receive the control word, the first logic circuit asserting control signals which operate a corresponding signal component output circuit in the first mode; and a second logic circuit connected to receive the control word, the second logic circuit asserting control signals which operate a corresponding signal component output circuit in the second mode.

9. The communication system according to claim 8, wherein the first metric corresponds to radiative emissions and wherein the second metric corresponds to power consumption.

10. The communication system according to claim 9, wherein each signal component output circuit comprises a differential current mode driver cell, the first mode comprising a Class-A constant common-mode current, the second mode comprising a Class-B variable common-mode current.

11. The communication system according to claim 10, wherein the control word takes on a same value to both adaptively disable a set of signal component output circuits and to control operation of the same set of signal component output circuits with respect to the first or second modes.

12. The communication system according to claim 11, wherein the transmitter includes an output DAC, the output DAC further including a DAC decoder circuit, the decoder circuit receiving input digital signals and outputting a control word to the signal component output circuits.

13. The communication system according to claim 12, each differential current mode driver cell comprising:

first and second current sources, each conducting an equal quanta of current;

first and second differential pairs, each pair coupled to a respective current source;

a pair of differential outputs, a first output connected to a first transistor comprising each of the differential pairs, a second output connected to a second transistor comprising each of the differential pairs; and four control signal inputs, each input controlling to a respective one of the transistors comprising the first and second differential pairs.

* * * * *